US009210216B2

(12) United States Patent
Roy

(10) Patent No.: US 9,210,216 B2
(45) Date of Patent: Dec. 8, 2015

(54) PEER TO PEER SUBSCRIPTION SERVICE

(75) Inventor: Shaibal Roy, Kamuela, HI (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 408 days.

(21) Appl. No.: 13/598,278

(22) Filed: Aug. 29, 2012

(65) Prior Publication Data

US 2012/0324549 A1 Dec. 20, 2012

Related U.S. Application Data

(62) Division of application No. 12/502,124, filed on Jul. 13, 2009, now Pat. No. 8,281,034.

(51) Int. Cl.
G06F 7/04 (2006.01)
H04L 29/08 (2006.01)
G06F 21/33 (2013.01)
G06F 15/173 (2006.01)

(52) U.S. Cl.
CPC ............ H04L 67/104 (2013.01); G06F 21/335 (2013.01); G06F 15/173 (2013.01)

(58) Field of Classification Search
None
See application file for complete search history.

(56) References Cited

U.S. PATENT DOCUMENTS

| | | | |
|---|---|---|---|
| 8,682,981 B2 * | 3/2014 | McCarthy et al. | 709/206 |
| 2003/0191828 A1 | 10/2003 | Ramanathan | |
| 2006/0073812 A1 * | 4/2006 | Punaganti Venkata et al. | 455/412.1 |
| 2007/0159651 A1 * | 7/2007 | Disario et al. | 358/1.15 |
| 2008/0133538 A1 | 6/2008 | Chavez | |
| 2009/0313353 A1 | 12/2009 | Lou | |
| 2009/0319502 A1 | 12/2009 | Chalouhi | |
| 2010/0088121 A1 * | 4/2010 | Shih et al. | 705/3 |
| 2010/0186053 A1 | 7/2010 | Zhang | |
| 2011/0010453 A1 | 1/2011 | Roy | |

FOREIGN PATENT DOCUMENTS

WO 2009095079 8/2009

OTHER PUBLICATIONS

Cohen, Bram, Incentives Build Robustness in BitTorrent, May 22, 2003, 5pgs.
Wikipedia, P2PTV, Oct. 20, 2009, 3pgs.
Wikipedia, Peer-to-peer, Oct. 20, 2009, 8pgs.
Wikipedia, BitTorrent (protocol), Oct. 20, 2009, 15pgs.
Wikipedia, Push technology, Oct. 20, 2009, 4pgs.
Wikipedia, Distributed hash table, Oct. 20, 2009, 6pgs.
"Understanding Direct Push," accessed at http://technet.microsoft.com/en-us/library/aa997252.aspx , last modified on Mar. 18, 2010, pp. 2.

(Continued)

*Primary Examiner* — Ryan Jakovac
(74) *Attorney, Agent, or Firm* — Jensen & Puntigam, PS

(57) ABSTRACT

Peer-to-peer approaches to servicing subscriptions to information feeds are generally disclosed. Network nodes may exchange information about information feeds that they can provide to other nodes, and other information about information feeds to which they may be interested in subscribing. Any of a variety of techniques may then be applied to allow the nodes to negotiate for feeds to which they may be interested in subscribing. For example, each node may apply algorithms that service feed subscriptions of other nodes on a prioritized basis, prioritized for example based on which other nodes service subscriptions in return.

19 Claims, 5 Drawing Sheets

(56) References Cited

OTHER PUBLICATIONS

Anagnostakis et al, "Exchange-based Incentive Mechanisms for Peer-to-Peer File Sharing", 2003, p. 1-11.

Liu et ai, "Client Behavior and Feed Characteristics fo RSS, a Publish-Subscribe System for Web Micronews", 2005, Internet Measurement Conference, p. 29-34.

Jun et ai, "FeedEx: Collaborative Exchange of News Feeds", May 26, 2006, International World Wide Web Committee, p. 1-10.

Ngan et al, "On designing incentives-compatible peer-to-peer systems", 2004, Dept. of Computer Science, Rice University, p. 1-3.

Sandler et al, "FeedTree: Sharing Web Micronews with Peer-to-Peer Event Notification", 2005, Springer-Verlag Berline Heidelberg, p. 141-151.

\* cited by examiner

PEER TO PEER SUBSCRIPTION SERVICE

CROSS-REFERENCE TO RELATED APPLICATION

This is a divisional application under 35 U.S.C. §121 of U.S. patent application Ser. No. 12/502,124, entitled "PEER TO PEER SUBSCRIPTION SERVICE", filed on Jul. 13, 2009, now U.S. Pat. No. 8,281,034.

BACKGROUND

Many of today's computer and mobile device users subscribe to information feeds such as sports scores, stock prices, weather information, news, one or more email inboxes, online calendars, and a wide variety of other information. Supporting these subscriptions using existing technologies involves massive, expensive, redundant, and geographically distributed data centers capable of terminating Internet Protocol (IP) connections from millions of computing devices.

The present disclosure appreciates that such data centers have a number of drawbacks. For example, current data centers are often unable increase their scale to accommodate new users quickly and effectively. A host of regulatory and national security issues can arise when data centers serve users in more than one nation, which is increasingly common and desirable due to the global connectivity of today's communications networks and diverse economic and regulatory environments. In addition, security and redundancy concerns lead to cost doubling or worse, because to ensure "always available" service, each data center may require a second, redundant data center. The redundant data center may be geographically isolated from the first, and of comparable proportions, with expensive real-time mirroring of all communication. While a variety of current technologies help to alleviate scalability problems, the present disclosure identifies that these technologies do not help with the fault-tolerance and regulatory concerns associated with large off-shore data centers.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
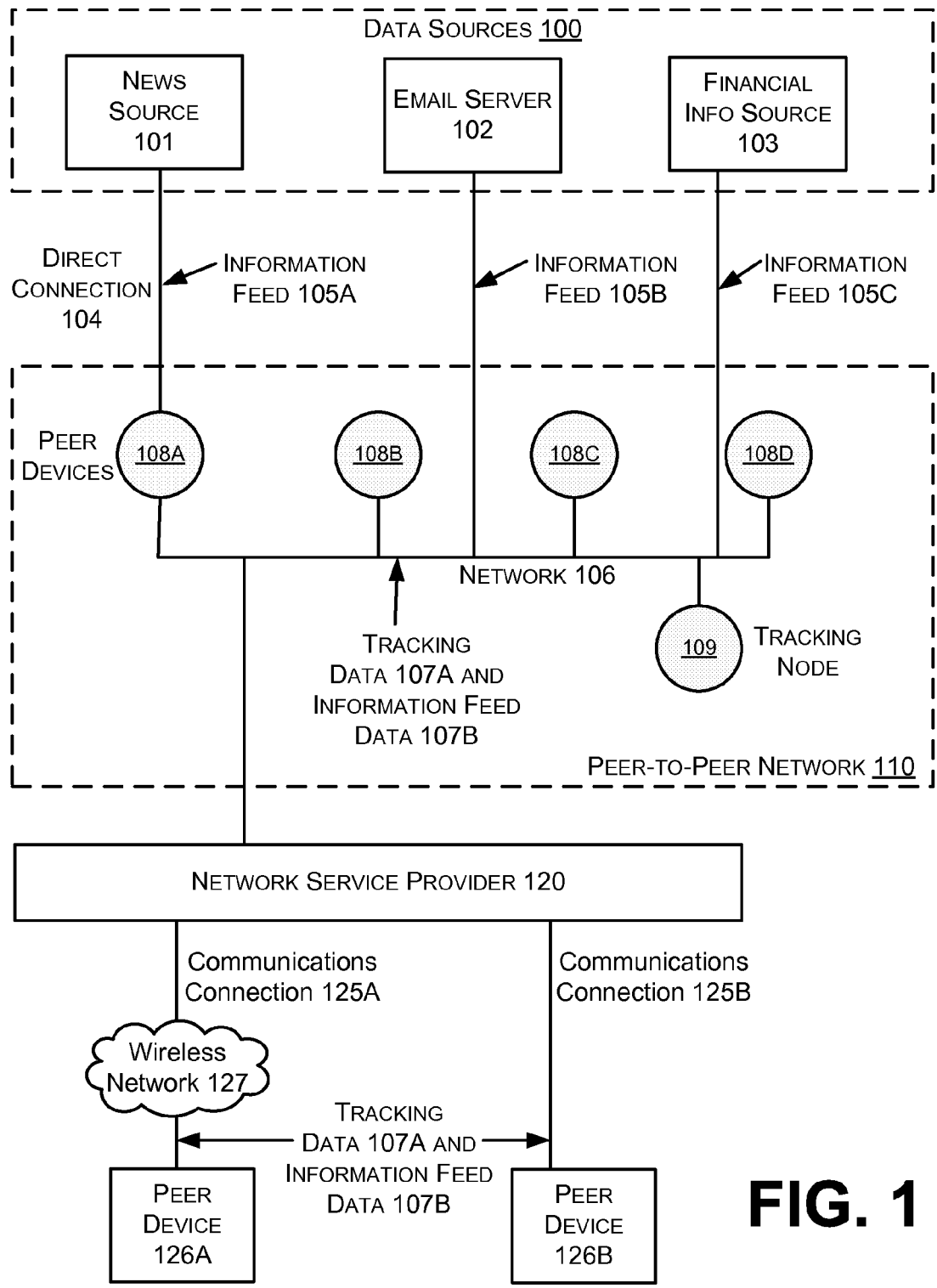
FIG. 1 is a block diagram illustrating an example peer-to-peer network coupled with various additional systems.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made part of this disclosure.

The present disclosure is drawn, inter alia, to methods, apparatus, and systems related to a peer-to-peer approach to servicing subscriptions to information feeds. Generally, peer-to-peer network nodes can exchange information about any information feeds which they can provide to other nodes, and information about any information feeds to which they request subscription service. Any of a variety of techniques may then be applied to allow the peer-to-peer nodes to negotiate for feeds to which they are configured to acquire.

When a device/network node is configured to acquire an information feed, the device/node may be described herein as "interested" in the information feed. The device/node itself of course has no interests; however a user or manufacturer of the device/node may configure the device/node to attempt to subscribe to certain identified feeds. Recognizing the device/node will attempt to acquire the identified feeds, but will generally continue operating without the feeds, the device/node is said to be interested in the feeds for ease of explanation herein.

In one example approach for network nodes negotiating for feeds in which they are interested, each node may apply algorithms that service feed subscriptions of other nodes on a prioritized basis, prioritized for example based on which other nodes service subscriptions in return. The result may optionally be scalable, reliable, secure, and cost-effective peer-to-peer support for large numbers of near real-time information feed subscriptions, flexible enough to accommodate non-traditional routing requirements, such as security and regulatory requirements of corporations and governments, scalable enough to support expansion of information feed subscriptions as the market for information continues to grow, and optionally adapted to leverage the power of next generation IP devices that will increasingly be consumers of information feeds, so that such devices may also play a role in servicing information feeds.

FIG. 1 is a block diagram illustrating an example peer-to-peer network coupled with various additional systems, in accordance with present disclosure. FIG. 1 includes data sources 100, a peer-to-peer network 110, network service provider 120 and peer devices 126A and 126B. Example data sources 100 may include one or more of news source 101, email server 102, and/or financial info source 103. Example devices/nodes of peer-to-peer network 110 may include peer devices 108A-108D and tracking node 109.

In FIG. 1, peer devices 108A-108D, tracking node 109, data sources 102 and 103, and network service provider 120 may be coupled to network 106. Tracking data 107A and information feed data 107B may be exchanged among these various components over network 106. Data sources 102 and 103 may supply information feeds 105B and 105C, respectively, to network 106 and other devices coupled thereto. Data source 101 may be coupled directly to peer device 108A via direct connection 104, and may be arranged to supply information feed 105A to peer device 108A, which may in turn supply information feed 105A to the various other devices coupled to network 106. Network service provider 120 may be coupled to peer devices 126A and 126B via communications connections 125A and 125B, respectively. Communications connection 125A may comprise a wireless network 127. Tracking data 107A and information feed data 107B may be exchanged among peer devices 126A and 126B and the various devices coupled to network 106 via communications connections 125A and 125B and network service provider 120.

Figure 2:
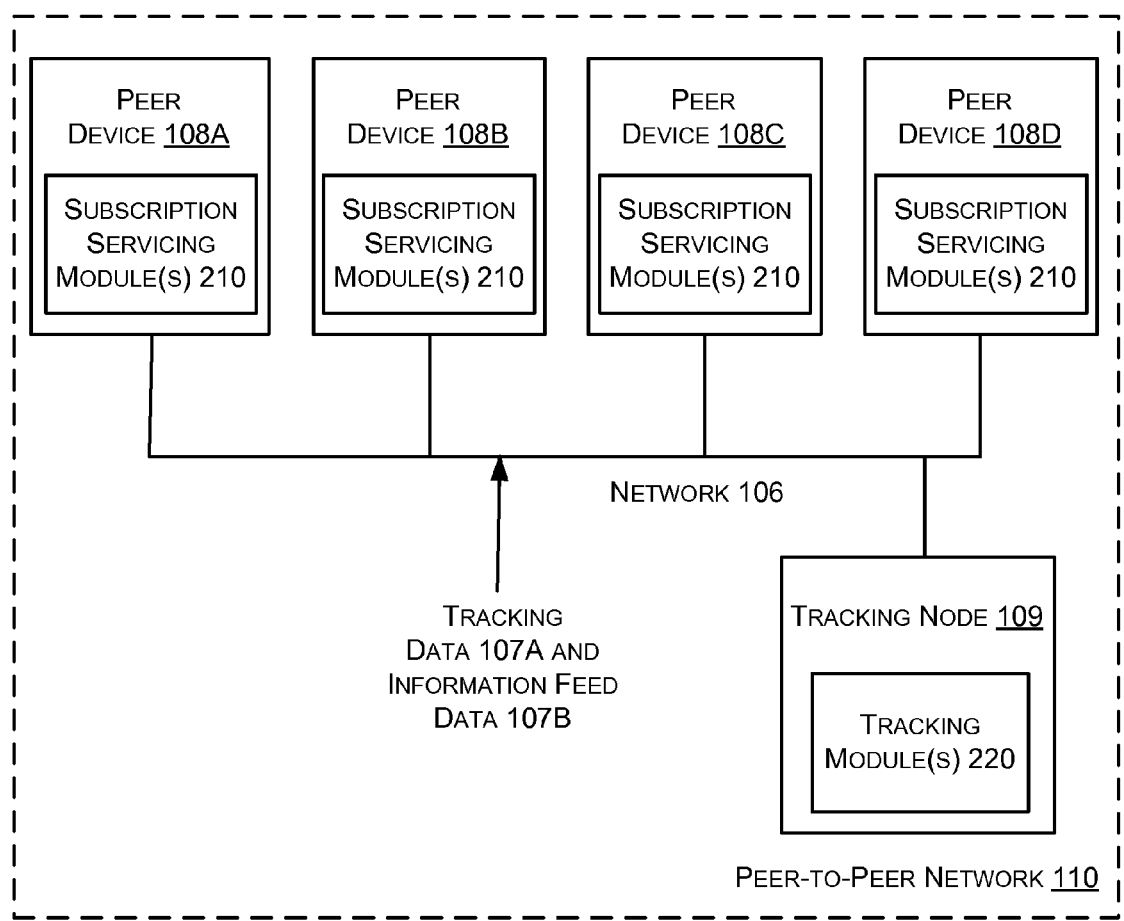
FIG. 2 is a block diagram illustrating an example peer-to-peer network over which tracking data and information feed data may be exchanged.

FIG. 2 is a block diagram illustrating an example peer-to-peer network over which tracking data and information feed data may be exchanged, in accordance with the present disclosure. FIG. 2 illustrates additional detail for an example peer-to-peer network such as peer-to-peer network 110 of FIG. 1, and like components are assigned like identifiers. FIG. 2 thus may include peer-to-peer network 110, where peer-to-peer network 110 may comprise peer devices 108A-108D and tracking node 109. Peer devices 108A-108D each may comprise subscription servicing module(s) 210. Tracking node 109 may comprise tracking module(s) 220.

In FIG. 2, peer devices 108A-108D and tracking node 109 of the peer-to-peer network 110 may be coupled via network 106, over which tracking data 107A and information feed data 107B may be exchanged.

In FIG. 1 and FIG. 2, each of the peer devices 108A-108D may be equipped with subscription servicing modules 210 as illustrated in FIG. 2, and tracking node 109 may be equipped with tracking modules 220 as illustrated in FIG. 2. One example of a peer-to-peer subscription servicing scenario according to FIGS. 1 and 2 may be as follows: A peer device such as 108B may become a subscriber to an information feed. For example, a user of peer device 108B may initiate a subscription for peer device 108B to information feed 105C. The user of peer device 108B may also be interested in subscribing to one or more additional feeds, such as information feed 105A. Peer device 108B may be arranged to distribute information identifying the one or more real-time information feeds which it may provide to the other peer devices 108A, 108B, and 108D. For example, in some embodiments, peer device 108B may be arranged to send a feed identifier for feed 105C to tracking node 109. Peer device 108B may also be arranged to distribute information identifying the one or more real-time information feeds to which the user may be interested in subscribing. For example, in some embodiments, peer device 108B may send a feed identifier for feed 105A to tracking node 109. The tracking node 109 may be arranged to identify that peer device 108A may provide feed 105A to peer device 108B, and may provide this information to peer device 108B. Peer device 108B may be arranged to request peer device 108A to service a subscription to feed 105A for peer device 108B.

Peer device 108A may be configured to apply any number of algorithms to determine whether to service the subscription for peer device 108B. In some embodiments, peer device 108A may for example service the subscription when peer device 108A is also interested in subscribing to feed 105C from peer device 108B. Peer device 108A may be configured to initiate servicing a subscription by interested peer device 108B to feed 105A; and peer device 108A may be configured to request peer device 108B to service a subscription to feed 105C for peer device 108A. Peer device 108B may be arranged to apply any number of algorithms to determine whether to service the subscription for peer device 108A.

Assuming peer device 108B agrees to service a subscription by interested peer device 108A to feed 105C; the peer devices 108A and 108B may be configured to initiate servicing each other's subscriptions. Because subscriptions are handled downstream from news source 101 and financial info source 103, the downstream peer devices relieve data centers that may support the data sources 101 and 103 from servicing the additional device subscriptions. A wide variety of options, features, and variants of the above described example are possible, as discussed below.

In FIG. 1 and FIG. 2, a peer device such as peer device 108B may subscribe to an information feed via a variety of technologies, any of which may be implemented by subscription servicing modules 210. For example, in some embodiments, so-called "long polling" may be used. With long polling, a subscribing peer device may request information from a server, which may for example comprise another peer device, or a data source from 100. If the server does not have any information available for the subscriber, the server may wait for some information to be available. Once the information becomes available, a complete response may be sent to the subscriber. The subscriber may then re-request information from the server, so that the server may almost always have an available waiting request that it may use to deliver data in response to an event.

Other technical options for subscription servicing may include Asynchronous JavaScript and XML (AJAX) based Rich Internet Application (RIA) services, as used for example by Websites such as GOOGLE® and YAHOO®, as well as "Server-Push technologies" such as the presently available COMET approach, which provides a web application model in which a long-held Hypertext Transfer Protocol (HTTP) request allows a web server to push data to a browser, without the browser explicitly requesting it. So-called "Java pushlets" may also be used. A pushlet is a technique originally developed for JAVA® web applications, though the same techniques may be employed on other web frameworks as well. For pushlet techniques, the server may take advantage of persistent HTTP connections and leave the response perpetually open, by never terminating the response, effectively fooling browsers into continuing to operate in a "loading" mode after an initial page load would normally be complete. The server may then periodically send snippets of java script to update the content of the page, thereby achieving push capability.

Subscription servicing approaches implemented in connection with the present disclosure may in some embodiments implement security measures. For example, some feeds may contain confidential or otherwise restricted information. Email is an example of feed information that is generally considered confidential. Feed information that is available only to paying subscribers is an example of restricted information. Confidential and restricted information generally should not be made available to unauthorized devices.

Confidential or otherwise restricted feeds may be encrypted at the source, such as by email server 102, using a key that is available to only the intended subscribers, then decrypted by subscribers possessing the key. Any encryption algorithms or architecture may be used to implement security in particular embodiments. For example, Data Encryption Standard (DES), Triple DES, and Advanced Encryption Standard (AES) are several encryption algorithms in use today. Example encryption architectures include Kerberos, public/private key architectures, and Secure/Multipurpose Internet Mail Extensions (S/MIME), to name just a few. Additional security measures may also be included in some embodiments, for example to prevent transmission of viruses and spam, and to guard against unauthorized access to devices and feed information.

Regardless of the specific technique used to subscribe to an information feed, a peer device may retain identifiers for the various feeds to which it is subscribed. This data may be obtained from a variety of sources. For example, if a particular program, such as an email client or feed reader client, such as a Real Simple Syndication (RSS) feed reader, is set up to subscribe to a particular feed, then feed identifiers may be obtained from such programs, or from a central operating system location in which such information may be stored. Alternatively, users may manually key feed identifiers for feeds to which a device is subscribed into a user interface provided by subscription servicing module(s) 210. Subscription servicing module(s) 210 may be arranged to retain identifiers for feeds in any suitable memory location. In some embodiments, a portable memory location may be used allowing the user to take their feed identifiers with them to any appropriately configured device, so that the feeds will be delivered to the user regardless of the user's location or the device they are using. In these embodiments, appropriate identifiers and settings, as well as the subscription servicing module(s) 210 themselves, can be portable along with the portable memory.

Similarly, subscription servicing module(s) 210 may be arranged to retain identifiers for feeds in which a device is interested in subscribing. This data (i.e., the identifiers for feeds) may be obtained from a variety of sources as set forth above. For example, the various applications, operating system, and/or device user may supply to servicing module(s) 210 identifiers for feeds that they wish to configure the device to subscribe to. Again, subscription servicing module(s) 210 may be arranged to retain identifiers for feeds in any suitable memory location.

A peer device having the stored information regarding existing feed subscriptions and desired subscriptions may be arranged to distribute such information to the other peer devices using a variety of techniques. For example, in some embodiments, a peer device may be configured to send feed identifiers to tracking node 109 as suggested above. The various other peer devices may then be configured to access the tracking node 109 to determine which devices have, or are interested in, which feeds. In some embodiments, exchanging tracking information with other peer devices may be done directly and without the use of a tracking node, for example by using one or more distributed hash tables.

When a subscription request is made, peer devices may apply any number of algorithms to determine whether to service a subscription for an interested peer device. Many such algorithms have been used or experimented with in the context of the popular peer-to-peer file sharing program, Bit-Torrent. Any algorithms now in use or as may later be developed for effective negotiation and cooperation among peer computing devices may be applied. Also, while in some embodiments the subscriptions servicing modules 210 on each of the peer devices 108A-108D may run a same algorithm for determining whether to service subscriptions, it may also be possible that in some embodiments subscriptions servicing modules 210 may be implemented differently and/or customized differently, or have different settings applied on the various devices 108A-108D. The settings may for example differ in rules for which peer devices to communicate with, when to service subscriptions requested by peer devices, which feeds to provide, how to prioritize among multiple peer devices requesting subscriptions, and how many subscriptions to service.

In some embodiments, a peer device may be configured to prioritize subscriptions servicing according to whether the peer device receives any subscriptions servicing in return. For example, when a first peer device is requested by a second peer device to service a subscription, the first device may initiate a query to identify what information feeds the second peer device may provide, and may check whether any such feeds match those feeds in which the first device may have an interest. If there is a match, the first device has an incentive to service the subscription per the request, and may increase the priority of servicing the subscription of the second device, as the second device may service the desired subscription of the first device in return. This is not to say that the first device necessarily only services subscriptions of devices that can provide something in return, although such embodiments are also possible.

Subscriptions service prioritization may be accomplished using any number of techniques. For example, in some embodiments, subscriptions servicing modules 210 may determine that a particular device has adequate power to service twenty-five (25) subscriptions, without significantly affecting performance or user experience. A list of the 25 serviced subscriptions may be maintained, where the top of the list may be the highest priority, and the bottom of the list may be the lowest priority. Every so often, for example, once a day, a new subscription may be serviced and priority of the new subscription may be determined against the existing subscriptions. If the new subscription is higher priority than any of the other subscriptions on the list, it may be inserted, and the subscription on the bottom of the list may cease to be serviced (e.g., when there are no available positions in the list). In some embodiments, some or all incoming subscription requests may initially be serviced for a period of time, then re-evaluated at the end of the period of time or at some point thereafter to allow a chance to exchange information about the requesting device and determine the value of continued information feed exchange with such device. Such approaches may be valuable from a systemic perspective, because they may allow entry of new devices (e.g., additional peer devices) into the system, which may initially not have any information feeds that they can provide to other peer devices.

In some embodiments, additional measurements may be used to adjust priority of servicing a subscription. For example, the BitTorrent algorithm uses a "rarest first" approach in which the rarest chunks of a file may be sought prior to the more common chunks of a file. In this albeit quite different context, servicing subscriptions of devices that may provide, in return, rare information feeds, may be prioritized over servicing subscriptions of devices that may provide widely available feeds.

In some embodiments, the servicing of an interested peer device subscription may be furthermore prioritized according to a value of feed subscription(s) that are provided by a peer device. A value may be associated with a feed, and this value may be used in prioritizing the peer device that provides the feed. The value may be assigned, for example, by subscriptions servicing modules 210 as a function of variables including a number of connections to an information feed. Number of connections to an information feed may comprise a number of other devices that also want the feed, as may be measured or approximated by a number of devices currently subscribed to a particular feed from the peer from which the feed is requested. Also, a value associated with a feed may be adjusted by subscriptions servicing modules 210 based on volume of data transfer corresponding to the information feed. This may be based for example on amount of data transferred for the feed in the last day, week, month, year, etc. Feeds that involve sending large amount of data may place a larger demand on the peer that is servicing the subscription, and so the feed with larger data volume may be assigned a higher value.

In some embodiments, a list of devices may be maintained whose subscriptions may be serviced unconditionally by a device. For example, when a peer device is also a corporate email server, employees' computers may be serviced unconditionally, regardless of whether such a peer device provides any services back to the server. Subscriptions servicing modules 210 may for example provide a user interface allowing entry of device identifiers for "exempt" devices, which may be serviced unconditionally.

In some embodiments, subscriptions to certain feeds may be supplied to any devices, without regard to whether the devices supply anything in return. For example, in the case where an information feed is that of an advertiser, ad-supported content provider, or other entity whose interest is distributing their information feed as widely as possible, without regard to demand placed on their own computing device, then subscriptions to that feed can be serviced for any requesting device, without dropping subscriptions from devices that do not reciprocate. Subscriptions servicing modules 210 may for example provide a user interface allowing entry of feed identifiers for "exempt" information feeds, provided unconditionally to any requesting device.

In some embodiments a peer device may require an interested peer device to meet predetermined criteria prior to servicing an interested peer device subscription. Such a feature may be useful for corporate or government regulatory requirements. For example, it may be that data is not allowed to come from offshore IP addresses. If so, subscriptions for devices with onshore IP addresses may be serviced. Any number of other requirements may be imposed, including for example requiring possession of a particular security certificate, and requiring certain device components and capabilities. Subscriptions servicing modules 210 may for example be arranged to provide a user interface to allow specification of requirements for devices for which subscriptions are serviced. Conversely, devices from which information feeds are obtained may similarly be required to meet predetermined criteria in the same fashion. For example, subscriptions servicing modules 210 on a first device may query subscriptions servicing modules 210 on a second device to determine whether the second device meets any specified criteria.

Certain embodiments may benefit from intermediate level authorization. For example, some feeds, such as email, may contain confidential information. It may nonetheless be desirable to allow peer device 108D to subscribe to an email or other confidential information feed 105B from email server 102A, and for device 108D to then service a subscription to the information feed 105B by peer device 108A. In such embodiments, peer device 108D may have an intermediate level authorization to receive notifications every time peer device 108A receives an email. The notifications may be sent along to peer device 108A pursuant to its subscription to the feed. Upon receiving the notifications, peer device 108A may connect to email server 102 and retrieve the confidential content of its email.

Email server 102 may be configured to support intermediate level authorization by, for example, requiring a peer device 108D to provide some credential, such as a password, indicating that peer device 108D is authorized by peer device 108A to receive a partial information feed. Having the intermediate level authorization credential, the email server 102 may provide partial feed information to the intermediate authorized device. The partial feed may comprise notifications as described above or other information on a feed that may be considered lower sensitivity than any confidential information in the full feed.

Other techniques for preserving confidentiality of certain feeds, or portions of feeds, are also possible. For example, if a feed or portions thereof are encrypted, peer devices with the appropriate decryption key will be able to decrypt and access the information. In some embodiments, a data source may supply an encrypted information feed to network 106, and may control devices with access to the feed by requiring registration and/or certain credentials prior to providing a decryption key.

Network provider 120 and peer devices 126A and 126B may also participate in the peer-to-peer network 110. In some embodiments, network service provider 120 may comprise for example a server associated with a mobile communications service such as AT&T®, VERIZON®, T-MOBILE®, SPRINT®, and the like. In some embodiments, peer devices 126A and 126B may not have adequate computing power or always-on network connections allowing peer devices 126A and 126B to participate in peer-to-peer network 110. In this scenario, network service provider 120 may aggregate information regarding feeds to which peer devices 126A and 126B may either provide, or may be interested in subscribing to. Network service provider 120 may then interact with the peers 108A-108D and/or tracking node 109 in the peer-to-peer network 110 and arranged to negotiate servicing of subscriptions on behalf of the peer devices 126A and 126B. Network service provider 120 may be part of a paid communications service, and so may be willing to provide information feeds as a service to peer device 126A.

In some embodiments, peer devices 126A and 126B may comprise, for example, smart phones or laptop computers with reliable network connections, capable of many or all of the functions described herein with reference to peer devices 108A-108D. In this scenario, peer devices 126A and 126B may function identically as peer devices 108A-108D.

Figure 3:
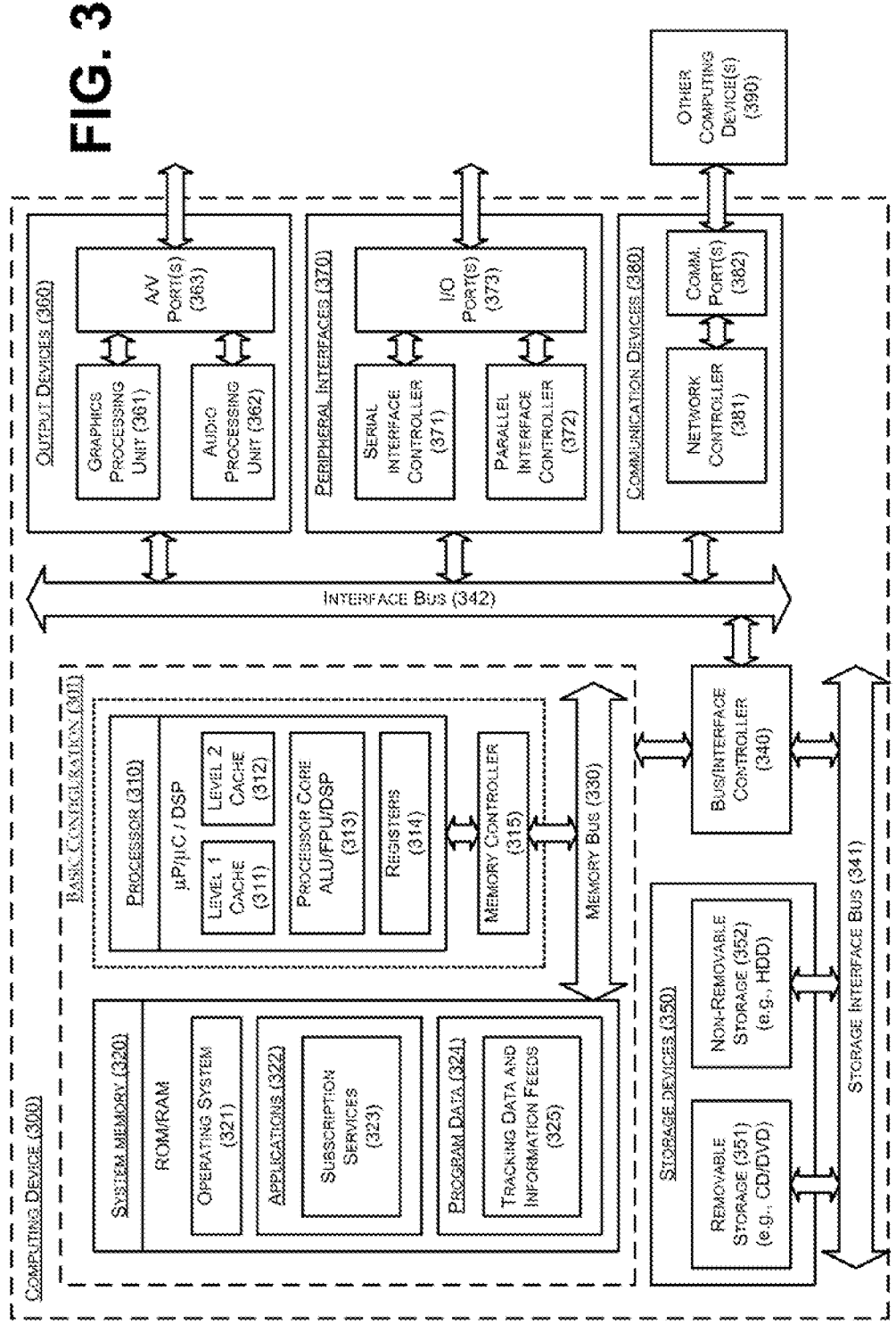
FIG. 3 is a block diagram illustrating an example computing device 300 that may serve as any of various computing devices provided herein.

FIG. 3 is a block diagram illustrating an example computing device 300 that may serve as any of nodes in the peer-to-peer network, in accordance with the present disclosure. In a very basic configuration 301, computing device 300 typically includes one or more processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.) or any combination thereof. System memory 320 typically includes an operating system 321 and one or more applications 322, including subscription servicing 323. Subscription servicing application 323 may include subscription services modules used subscribe to information feeds, disseminate information on the feeds a device has and the feeds it wants, and to determine whether to service subscription requests from interested peer devices. Program Data 324 may include tracking data and information feeds 325 used to publish feed availability and interest information, and to provide data feeds to the nodes on the peer-to-peer network. In some embodiments, application 322 may be arranged to operate with program data 324 on an operating system 321 such that application 322 functions as a node on the peer-to-peer network overlay that provides both data and accesses subscriptions from this network. This described basic configuration is illustrated in FIG. 3 by those components within dashed line 301.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 320, removable storage 351 and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of device 300.

Computing device 300 may also include an interface bus 332 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 include a serial interface controller 371 or a parallel interface controller 372, which may be configured to communicate with external devices such as input devices (e.g., keyboard, mouse, pen, voice input device, touch input device, etc.) or other peripheral devices (e.g., printer, scanner, etc.) via one or more I/O ports 373. An example communication device 380 includes a network controller 381, which may be arranged to facilitate communications with one or more other computing devices 390 over a network communication via one or more communication ports 382.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media.

Computing device 300 may be implemented as a stationary computer including both laptop computer and non-laptop computer configurations or as an "always-on-IP" mobile device (e.g., BlackBerry, iPhone, MSMobile 5 and 6, Symbian S60, Google Android).

Figure 4:
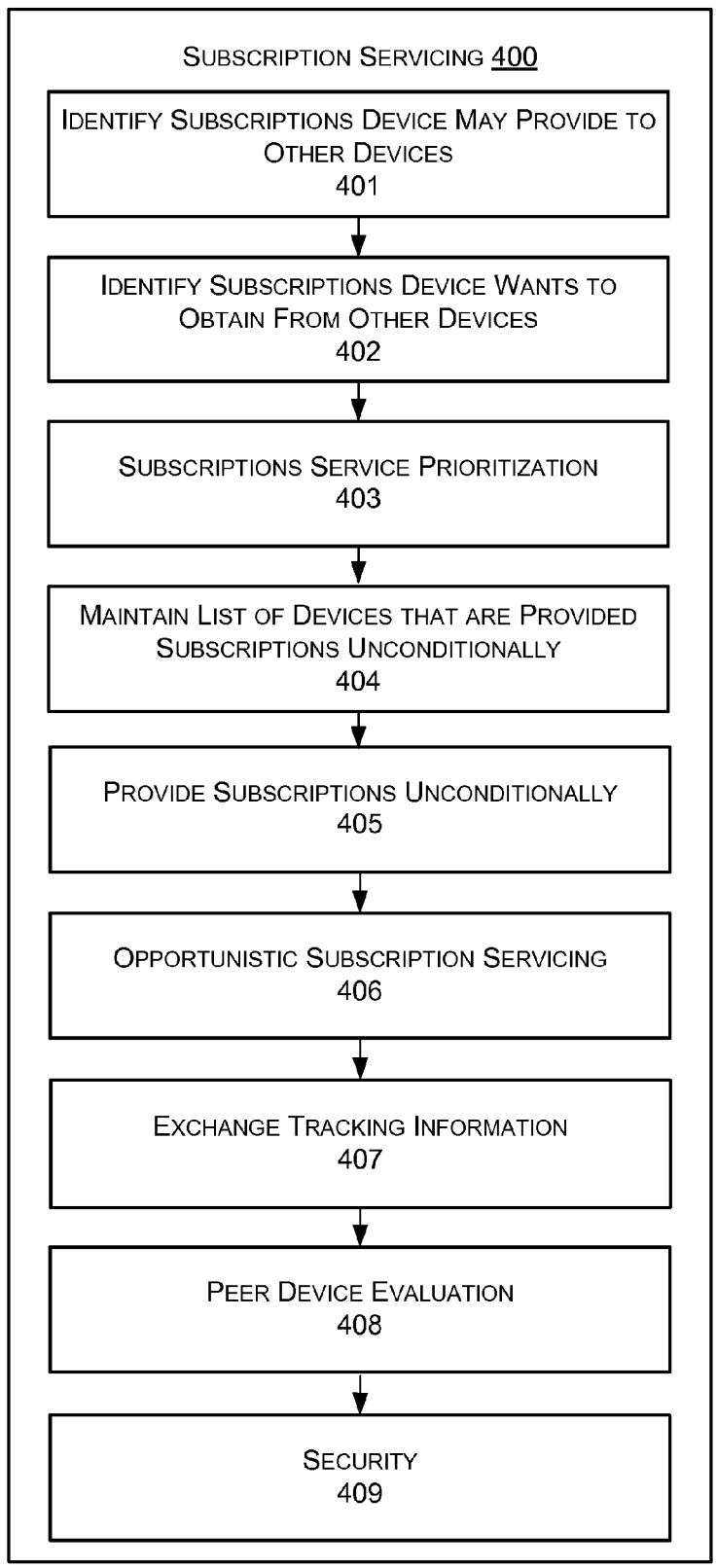
FIG. 4 is a flow diagram illustrating an example method that may be performed in connection with subscription servicing.

FIG. 4 is a flow diagram illustrating an example method that may be performed by a first device in connection with subscription servicing, in accordance with the present disclosure. FIG. 4 also illustrates a device and/or computer readable medium including modules for carrying out the described methods. The illustrated methods may include one or more processing operations, functions or modules as illustrated by blocks 401-409. Blocks 401-409 may include a "Identify Subscriptions Device may Provide to Other Devices" block 401, a "Identify Subscriptions Device Wants to Obtain From Other Devices" block 402, a "Subscriptions Service Prioritization" block 403, a "Maintain List of Devices that are Provided Subscriptions Unconditionally" block 404, a "Provide Subscriptions Unconditionally" block 405, a "Opportunistic Subscription Servicing" block 406, a "Exchange Tracking Information" block 407, a "Peer Device Evaluation" block 408, and a "Security" block 409.

In FIG. 4, various blocks 401-409 are illustrated as being performed sequentially, with block 401 being initiated first and block 409 being initiated last. It will be appreciated however that these blocks may be re-ordered as convenient to suit particular embodiments and that these blocks or portions thereof may be performed concurrently in some embodiments.

FIG. 4 discloses functional modules that may be implemented by hardware and/or software in completing servicing system 400, as well as instructions that may be stored on a computer readable medium, and operations of an example method. FIG. 4 will be described herein as a method with the understanding that the disclosure also contemplates hardware and software implementations designed to carry out such a method.

In general, FIG. 4 illustrates operations as may be performed by first device, which may be for example a peer device in a peer network, or in some cases by a data source that may be arranged to provide information feeds to a peer network. The operations may include, for example, one or more operations for subscribing to information feeds, operations for servicing feed requests of interested peer devices, operations for determining which subscriptions to service, and/or operations supporting certain special cases as may be desired in some embodiments.

At block 401, "Identify Subscriptions Device may Provide to Other Devices", a first device (node) in the peer-to-peer network may be configured to identify one or more real-time information feeds that it may provide to other devices on the network. In some embodiments, this may be done by storing feed identifier information in a tracking table. The information in the tracking table may occasionally be distributed, for example by sending it to a tracking node. The information may for example be distributed periodically, or whenever new information is available, or upon request from a tracking node.

At block 402, "Identify Subscriptions Device Wants to Obtain From Other Devices", a first device in the peer-to-peer network may be configured to identify one or more real-time information feeds that it wants from other devices on the network. In some embodiments, this may be obtained from various applications that may submit feed requests, for example, by making a call to a subscription servicing module. In some embodiments, this information may be obtained from a central memory location designated by an operating system for storing feed information. In some embodiments, this information may be obtained from a user via a user interface supplied for example by a subscription servicing module. Regardless of where the information is obtained from, the information may be stored along with the other feed information in a tracking table. The tracking table may separate identifiers for feeds which a device has subscriptions to from identifiers for feeds to which a device is interested in subscribing. The information in the tracking table may occasionally be distributed, for example by sending it to a tracking node, as discussed above.

At block 403, "Subscriptions Service Prioritization", the first device can prioritize peer devices to determine which peer devices to service subscriptions for. High priority peer devices can be serviced, while low priority peer devices can be dropped. Alternatively, low priority peer devices can have their quality of service subject to available computing and bandwidth resources, or may otherwise be subject to lower quality of service. Prioritization by the first device may comprise a selection of which peer devices to service, as servicing subscriptions by unlimited peer devices is neither possible nor desirable for most devices with limited computing power and limited available network bandwidth. As a result, some method of selecting the most appropriate subscriptions to service is desired. In some embodiments, subscriptions may be prioritized based on which devices service subscriptions in return. Subscriptions may furthermore be assigned relative values, so that higher value services (the services provided to devices that provide lots of valuable subscription servicing in return) can be prioritized over lower value services. One metric for determining relative value of a subscription may be a function of the number of connections to the real-time information feed subscription as it is serviced by the serving peer device. For example, a feed to which there are 10 subscribers may be more valuable than a feed to which there is one subscriber. Another metric for determining relative value of a subscription may be a function of the volume of data being transferred pursuant to the feed. A large amount of data transmission places large computing and bandwidth requirements on the device that services the subscription. Such a device may be more likely to drop subscriptions of devices that do not reciprocate with a similar level of service. By prioritizing the large data volume subscriptions, it is more likely that a high level of service will be reciprocated.

At block 404, "Maintain List of Devices that are Provided Subscriptions Unconditionally", the first device may be further configured to include a feature in which the first device provides certain identified peer devices with real-time information feeds without requiring that the receiving nodes/peer devices provide real-time data feeds in return. For example, in a situation where a peer device serves as a business email server, the first device may provide email to the employees of the business regardless of whether the employees' devices provide any information feed services in return.

At block 405, "Provide Subscriptions Unconditionally", the first device may service subscriptions to certain identified feed(s) unconditionally, for example, without requiring peer devices that subscribe to the identified feed(s) to service any subscriptions for the first device in return. In some embodiments, a user may identify, for example by flagging certain feeds, those feeds which are provided by the first device unconditionally to any interested device. These feeds may for example contain information, such as promotional information or advertisement-supported information, which the user of the first device wants to be distributed and is willing to configure the first device to bear the burden of servicing any interested peer.

At block 406, "Opportunistic Subscription Servicing", unconditional service may be provided by the first device to interested peer devices on the network for a designated period of time and then re-evaluated at the end of that period. Opportunistic servicing can provide a number of benefits. In some embodiments, opportunistic scheduling allows a peer to continually improve its relationships with other peers. For example, by periodically servicing a new peer, an opportunity may be created to exchange subscription services with that new peer. The new peer may be able to service valuable subscriptions that may otherwise be unavailable or available at a low quality of service. If the new peer can provide a valuable subscription, then the new peer may supplement or replace other peers for which subscriptions are being serviced. If the new peer cannot provide any valuable subscriptions, then the new peer can be reassessed by the first device and services of the first device for that peer dropped by the first device after some period of time.

At block 407, "Exchange Tracking Information", tracking information as identified in blocks 401 and 402 may be exchanged between the first device and various peer devices associated with the network. The tracking information allows the first device to ascertain which peer devices in the network have access to data feeds in which the first device is interested. In some embodiments, certain nodes or devices on the network may function specifically as tracking nodes or servers. The function of a tracking node may be to maintain a list of devices, along with feeds available from each device, and feeds in which the devices are interested, referred to as tracking information. The tracking information may then be supplied by a tracking node to any device in the network upon request. For example, a first device may request a tracking node to identify devices that may service a subscription to information feed Y. The tracking node can send a response to the first device comprising identification information for the devices that indicated such a capability. The tracking node may identify all such devices, or a subset of the devices, for example a subset that has also indicated interest in a subscription which the first device has indicated it can provide in return.

In some embodiments, tracking information may also be exchanged between the first device and peer devices on the network without the use of tracking nodes. Tracking information may be exchanged directly among peers using hash tables. Distributed hash tables (DHTs) are a class of decentralized distributed systems that provide a lookup service using (name, value) pairs that are stored in the DHT, and any participating node may efficiently retrieve the value associated with a given name. Responsibility for maintaining the mapping from names to values is distributed among the nodes in the peer-to-peer network, in such a way that a change in the set of participants causes a minimal amount of disruption. DHTs allow a peer to peer network to scale to extremely large numbers of nodes and to handle continual node arrivals, departures, and failures.

At block 408, "Peer Device Evaluation", a first peer device may evaluate a second peer device prior to servicing a subscription for the second device, or conversely, prior to subscribing to an information feed that is serviced by the second device. The second device may be evaluated for any criteria. Example criteria may include a physical location within a particular nation or geographical location, association with a particular group, hardware and software requirements, and/or possession of a certificate.

At block 409, "Security", any of a variety of security measures may be implemented, depending on the embodiment. As described above, some feeds may contain confidential or otherwise restricted information. The confidential information may be protected, such as by encrypting the confidential information, so unauthorized intermediate devices cannot access it. Security module 409 may encrypt confidential feeds, or may identify feeds containing encrypted information as secure feeds, requiring presentation of appropriate credentials and/or possession of appropriate certificates.

For example, in some embodiments, a first peer device may perform a method for servicing a real time information feed subscription of a second peer device, wherein the first peer device and the second peer device are connected to a network. The method performed by the first peer device may comprise distributing to a network identifiers of one or more real time information feeds to which the first peer device is subscribed. The one or more real time information feeds to which the first peer device is subscribed may include, inter alia, intermediate level authorization feeds for which the first peer device may be authorized to receive notifications or other partial information, as described herein. The one or more real time information feeds may for example comprise at least one confidential or restricted real time information feed. The first peer device may then receive via the network a request for the confidential or restricted real time information feed from a second peer device. The second peer device may have a security credential authorizing the second peer device to receive full or partial information from the requested confidential or restricted real time information feed. This security credential may for example be sent to the first peer device along with the request for the confidential feed, or in some embodiments, the credential may be supplied in response to a subsequent request for the credential. Security module 409 may then validate the security credential of the second peer device, using for example any of the certificate validation software and methods in use today, or as may be later developed. If the security credential is valid, the first peer device may proceed to service a subscription to the confidential or restricted real time information feed by providing via the network the confidential or restricted real time information feed to the second peer device.

In some embodiments, security module 409 may also present credentials and certificates associated with a first peer device, so that the first peer device may access requested feeds. For example, in some embodiments, the first peer device may subscribe to a confidential or restricted real time information feed, wherein the subscribing includes presenting a security credential associated with the first peer device to another device, such as a peer device or data source, via the network. The first peer device may request a secure feed from a data source, and the data source may respond with a request for credentials. The security module 409 may supply the requested credentials in response to the request. As described above, any encryption algorithms or architecture may be used to implement security in particular embodiments, and additional security measures may also be included in some embodiments, for example to prevent transmission of viruses and spam, and to guard against unauthorized access to devices and feed information.

Figure 5:
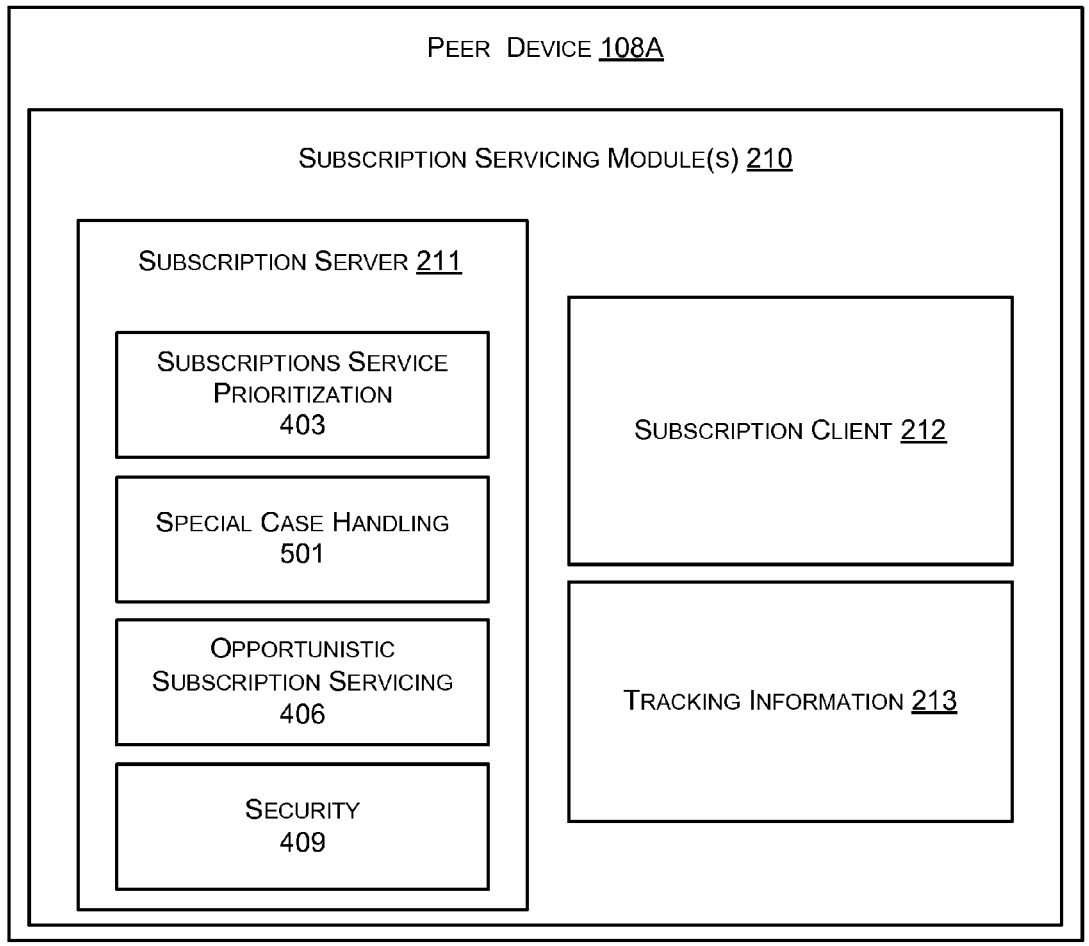
FIG. 5 is a block diagram illustrating subscription servicing module(s)

FIG. 5 is a block diagram illustrating subscription servicing module(s), in accordance with the present disclosure. FIG. 5 comprises peer device 108A as illustrated in FIGS. 1 and 2, and like elements are given like identifiers. Peer device 108A may comprise subscription servicing block 210. Subscription servicing block 210 may comprise subscription server 211, subscription client 212, and/or tracking information 213. Subscription server 211 may comprise subscription service prioritization block 403, special case handling block 501, and/or opportunistic subscription servicing block 406, and/or security block 409.

Generally, FIG. 5 illustrates a division of subscription servicing module(s) 210 into logical components. The subscription server 211 can be arranged to handle incoming requests from interested peer devices, which may request the peer device 108A to service a subscription. The subscription client 212 can be arranged to handle sending requests for subscription service to other peer devices, and subsequent information feed management. The tracking information 213 can contain tracking information used by the server 211 and/or the client 213.

Subscription server 211 may comprise subscription service prioritization block 403, special case handling block 601, opportunistic subscription servicing block 406, and/or security block 409, for example as discussed above in connection with FIG. 4. Special case handling block 501 may for example be arranged to provide for serving certain devices and/or providing feeds unconditionally, as discussed in connection with blocks 404 and 405 from FIG. 4.

Subscription client 212 can be configured to handle sending requests for subscription service to other peer devices, and subsequent information feed management. Subscription client 212 may benefit from some communication with subscription server 211. For example, if the server 211 is serving subscriptions for devices that can provide feeds that the client 212 wants, the server 211 may provide appropriate device identifiers to the client 212, allowing the client 212 to request desired feeds from devices that are likely to reciprocate. The client 212 may also be arranged to communicate with a tracking server, also for the purpose of identifying devices having feeds in which the client 212 is interested. Once a desired subscription is secured by the client 212, the client 212 may measure and track quality of service metrics, such as delay in the service and availability of the feed. The quality of service information can be used in determining whether to continue receiving a feed from a particular peer, or to attempt a change if available. Also, the client 212 may be configured to perform any actions needed to continue subscriptions, such as updating registrations and sending long-polling requests.

The tracking information 213 may include tracking information used by the server 211 and client 212. Tracking information 213 may also include functional modules for gathering information from a tracking server or from other peers, and for gathering information from the peer device 108A, such as information identifying what feeds the device user is interested in receiving, and information identifying what feeds the device 108A is subscribed to. Tracking modules may for example comprise blocks 401 and 402 from FIG. 4. Gathered tracking information may be placed by tracking modules in a data location maintained by tracking information 213, which may be accessible to subscription server 211, subscription client 212, and optionally to other applications installed on device 108A and a tracking node and/or other peer devices of a peer-to-peer network.

Figure 6:
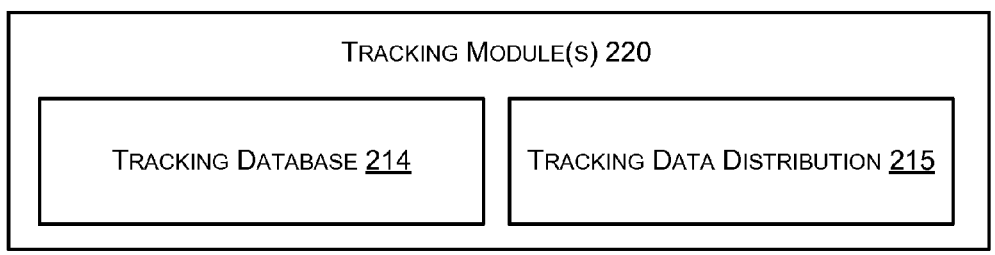
FIG. 6 is a block diagram illustrating tracking module(s); all arranged in accordance with the present disclosure.

FIG. 6 is a block diagram illustrating tracking module(s), in accordance with the present disclosure. In FIG. 6, block 220 represents tracking modules 220 comprising a tracking database 214 and a tracking data distribution 215.

The tracking modules 220 of FIG. 6 may reside on a tracking server, or in distributed tracking embodiments, may reside on peer devices. The tracking modules 220 may be designed to aggregate tracking data, and/or to distribute tracking data.

The tracking database 214 may be configured to aggregate tracking data. Tracking data may be received by tracking modules 220 in a tracking server from peer devices in a peer device network, and may be placed by the tracking modules 220 in the tracking database 214. Tracking data may include device identifiers, along with the information feeds that can be provided by each device, and the information feeds each device may be interested in.

The tracking data distribution module(s) 215 distribute tracking data to the various peer devices of a peer network. The tracking data distributed to devices may be provided in a variety of configurations. For example, in some embodiments, all tracking data may be provided by data distribution module(s) 215 to peer devices, and the peer devices can be configured to determine how to use the data to identify other relevant peers. In some embodiments, tracking data can be limited to data that is requested by a device. For example, a peer device that requests tracking information from a tracking server comprising tracking modules 220 may request identification of all peers that may service a subscription to information feed XYZ. The tracking data distribution module(s) 215 can query the database 214, and provide the requested information. In some embodiments, tracking data distribution module(s) 215 may itself provide information feeds which can be subscribed to, and which provide information regarding new sources of information feeds. In some embodiments, tracking data distribution module(s) 215 may provide additional intelligence regarding the best information feed peer for a particular request, for example using historic quality of service measurements associated with peers in the peer to peer network.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A method for servicing, by a first peer device, an encrypted confidential or restricted real time information feed subscription of a second peer device, wherein the first peer device and the second peer device are connected to a network, the method performed by the first peer device comprising:
   identifying, by the first peer device, one or more real time information feeds to which the first peer device is subscribed, wherein the one or more real time information feeds include the encrypted confidential or restricted real time information feed;
   wherein the first peer device has a first peer device security credential authorizing the first peer device to subscribe to the encrypted confidential or restricted real time information feed, and wherein the first peer device security credential comprises an intermediate level security credential that authorizes the first peer device to receive partial information from the encrypted confidential or restricted real time information feed, the partial information including notifications of times that information is sent on the encrypted confidential or restricted real time information feed, and wherein the first peer device security credential does not enable the first peer device to decrypt the encrypted confidential or restricted real time information feed;
   distributing, to the network, by the first peer device, identifiers of the one or more real time information feeds to which the first peer device is subscribed, the identifiers comprising an identifier for the encrypted confidential or restricted real time information feed;
   receiving, via the network, by the first peer device, a request for the encrypted confidential or restricted real time information feed from a second peer device;
   receiving, via the network, by the first peer device, a second peer device security credential that authorizes the second peer device to receive the encrypted confidential or restricted real time information feed, wherein the second peer device security credential authorizes the second peer device to decrypt the encrypted confidential or restricted real time information feed;
   validating, by the first peer device, the second peer device security credential; and
   servicing, by the first peer device, a subscription to the encrypted confidential or restricted real time information feed by providing the encrypted confidential or restricted real time information feed to the second peer device via the network.

2. The method of claim 1, wherein the encrypted confidential or restricted real time information feed comprises an encrypted confidential email information feed.

3. The method of claim 1, wherein the encrypted confidential or restricted real time information feed comprises an encrypted restricted information feed that is restricted to paying subscribers.

4. The method of claim 1, wherein the second peer device security credential comprises a security certificate.

5. The method of claim 1, wherein distributing to the network the identifiers of one or more real time information feeds comprises sending the identifiers to a tracking node.

6. A computing device configured as a first peer device to service an encrypted confidential or restricted real time information feed subscription of a second peer device, wherein the first peer device and the second peer device are connected to a network, the first peer device comprising:
   a processor;
   a memory; and
   a subscription servicing module stored in the memory and executable by the processor, wherein the subscription servicing module is configured to:
      identify, by the first peer device, one or more real time information feeds to which the first peer device is subscribed, wherein the one or more real time information feeds include the encrypted confidential or restricted real time information feed;

wherein the first peer device has a first peer device security credential authorizing the first peer device to subscribe to the encrypted confidential or restricted real time information feed, and wherein the first peer device security credential comprises an intermediate level security credential that authorizes the first peer device to receive partial information from the encrypted confidential or restricted real time information feed, the partial information including notifications of times that information is sent on the encrypted confidential or restricted real time information feed, and wherein the first peer device security credential does not enable the first peer device to decrypt the encrypted confidential or restricted real time information feed;

distribute, to the network, by the first peer device, identifiers of the one or more real time information feeds to which the first peer device is subscribed, the identifiers comprising an identifier for the encrypted confidential or restricted real time information feed;

receive, via the network, by the first peer device, a request for the encrypted confidential or restricted real time information feed from a second peer device;

receive, via the network, by the first peer device, a second peer device security credential that authorizes the second peer device to receive the encrypted confidential or restricted real time information feed, wherein the second peer device security credential authorizes the second peer device to decrypt the encrypted confidential or restricted real time information feed;

validate, by the first peer device, the second peer device security credential; and service, by the first peer device, a subscription to the encrypted confidential or restricted real time information feed by providing the encrypted confidential or restricted real time information feed to the second peer device via the network.

7. The first peer device of claim 6, wherein the encrypted confidential or restricted real time information feed comprises an encrypted confidential email information feed.

8. The first peer device of claim 6, wherein the encrypted confidential or restricted real time information feed comprises an encrypted restricted information feed that is restricted to paying subscribers.

9. The first peer device of claim 6, wherein the second peer device security credential comprises a security certificate.

10. The first peer device of claim 6, wherein distributing to the network the identifiers of one or more real time information feeds comprises sending the identifiers to a tracking node.

11. A non-transitory computer readable storage medium having computer executable instructions executable by a processor, the instructions that, when executed by the processor cause the processor to:

identify, by the first peer device, one or more real time information feeds to which the first peer device is subscribed, wherein the one or more real time information feeds include an encrypted confidential or restricted real time information feed;

wherein the first peer device has a first peer device security credential authorizing the first peer device to subscribe to the encrypted confidential or restricted real time information feed, and wherein the first peer device security credential comprises an intermediate level security credential that authorizes the first peer device to receive partial information from the encrypted confidential or restricted real time information feed, the partial information including notifications of times that information is sent on the encrypted confidential or restricted real time information feed, and wherein the first peer device security credential does not enable the first peer device to decrypt the encrypted confidential or restricted real time information feed;

distribute, to the network, by the first peer device, identifiers of the one or more real time information feeds to which the first peer device is subscribed, the identifiers comprising an identifier for the encrypted confidential or restricted real time information feed;

receive, via the network, by the first peer device, a request for the encrypted confidential or restricted real time information feed from a second peer device;

receive, via the network, by the first peer device, a second peer device security credential authorizing the second peer device to receive the encrypted confidential or restricted real time information feed, wherein the second peer device security credential authorizes the second peer device to decrypt the encrypted confidential or restricted real time information feed;

validate, by the first peer device, the second peer device security credential; and service, by the first peer device, a subscription to the encrypted confidential or restricted real time information feed by providing the encrypted confidential or restricted real time information feed to the second peer device via the network.

12. The non-transitory computer readable storage medium of claim 11, wherein the encrypted confidential or restricted real time information feed comprises an encrypted confidential email information feed.

13. The non-transitory computer readable storage medium of claim 11, wherein the encrypted confidential or restricted real time information feed comprises an encrypted restricted information feed that is restricted to paying subscribers.

14. The non-transitory computer readable storage medium of claim 11, wherein the second peer device security credential comprises a security certificate.

15. The non-transitory computer readable storage medium of claim 11, wherein distributing to the network the identifiers of one or more real time information feeds comprises sending the identifiers to a tracking node.

16. The method of claim 1, further comprising:

identifying, by the first peer device, one or more real time information feeds to which the first peer device is interested in subscribing; and distributing, to the network, by the first peer device, identifiers of the one or more real time information feeds to which the first peer device is interested in subscribing;

wherein the identifiers of the one or more real time information feeds to which the first peer device is interested in subscribing are separated from the identifiers of the one or more real time information feeds to which the first peer device is subscribed.

17. The method of claim 1, further comprising prioritizing, by the first peer device, servicing of subscription feeds for peer devices, including the second peer device subscription to the encrypted confidential or restricted real time information feed.

18. The method of claim 1, further comprising requiring, by the first peer device, that the second peer device meets an Internet Protocol (IP) address criteria prior to servicing, by the first peer device, the subscription to the encrypted confidential or restricted real time information feed by providing the encrypted confidential or restricted real time information feed to the second peer device.

19. The method of claim 1, further comprising providing, by the first peer device, a user interface to allow specification of requirements for the second peer device prior to servicing, by the first peer device, the subscription to the encrypted confidential or restricted real time information feed by providing the encrypted confidential or restricted real time information feed to the second peer device.

\* \* \* \* \*